Figure 1:
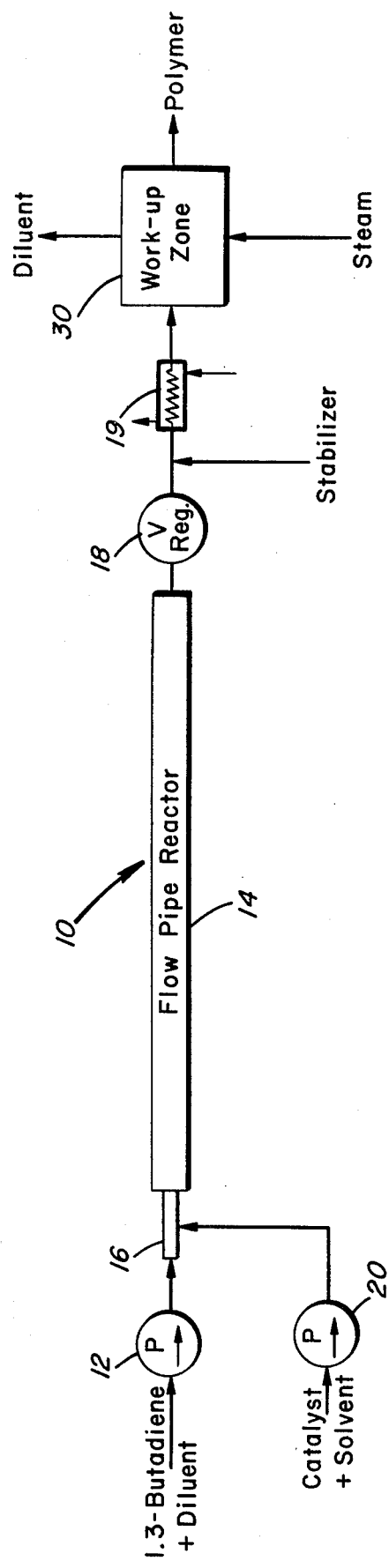

United States Patent [19]

Sommer et al.

[11] 4,016,347

[45] Apr. 5, 1977

[54] PROCESS FOR THE PRODUCTION OF POLYMERS HAVING A BROAD MOLECULAR WEIGHT DISTRIBUTION

[75] Inventors: Neithart Sommer; Gerhard Cuntze, both of Marl; Wolfgang Boehmer, Oer-Erkenschwick, all of Germany

[73] Assignee: Chemische Werke Huls Aktiengesellschaft, Marl, Germany

[22] Filed: Aug. 8, 1975

[21] Appl. No.: 603,172

[30] Foreign Application Priority Data

Aug. 9, 1974 Germany ............................ 2438322

[52] U.S. Cl. ...................................... 526/64; 526/79; 526/86; 526/173; 526/335
[51] Int. Cl.² ...................... C08F 4/48; C08F 36/06
[58] Field of Search ................ 526/64, 79, 86, 173

[56] References Cited

UNITED STATES PATENTS

| | | | |
|---|---|---|---|
| 3,402,160 | 9/1968 | Hayes | 526/173 |
| 3,812,088 | 5/1974 | Bennett | 526/64 |

*Primary Examiner*—Alan Holler
*Attorney, Agent, or Firm*—Millen & White

[57] ABSTRACT

1,3-Butadiene is polymerized to polymers having broad molecular weight distribution in a continuous-adiabatic organolithium catalyzed polymerization in a flow pipe reactor by varying in a periodic manner the ratio of catalyst to 1,3-butadiene being charged to the reactor and mixing the polymers thus produced.

4 Claims, 3 Drawing Figures

PROCESS FOR THE PRODUCTION OF POLYMERS HAVING A BROAD MOLECULAR WEIGHT DISTRIBUTION

BACKGROUND OF THE INVENTION

Synthetic rubbers produced from, for example, butadiene homopolymers and statistical butadiene/styrene copolymers employing organolithium catalysts have become increasingly popular in technical manufacturing processes, especially in the production of passenger car tire treads.

During the course of this development, it has been found that an important governing factor for the processing properties of the synthetic rubber, in addition to its long-chain branching, is its molecular weight distribution.

A broadening of the molecular weight distribution results, for example, in improved roll adhesion, shorter mixing time, lower mixture viscosity and lower extrusion temperature.

To attain such an improvement in the processing characteristics of the rubber, polymerization techniques have been developed which lead to polymers having a broadened molecular weight distribution. Very many of these processes, e.g., those wherein branching reagents are utilized, do effect a broadening of the molecular weight distribution, but lead to an increase in the long-chain branching.

However, it is definitely desirable to increase the breadth of the molecular weight distribution alone, with the long-chain brancing remaining unchanged, so that the aforementioned processing properties of the rubber can be improved in a precisely controlled fashion.

Thus, a process for the polymerization of 1,3-dienes is known from Unexamined Laid-Open German Pat. No. DOS 1,520,854 wherein, after a degree of polymerization of about 70–80% conversion has been attained, the reaction is terminated and catalyst is once more introduced, thus making it possible to manufacture a high-molecular proportion and a low-molecular proportion and concomitantly attaining a broadening of the molecular weight distribution.

Furthermore, a process for the polymerization of 1,3-butadiene is known from U.S. Pat. No. 3,382,224, wherein solvent is added during the course of the polymerization for dilution purposes. In this process, the impurities contained in the solvent cause the growing polymer chains to be partially broken off, whereby a broadening of the molecular weight distribution in the polymer is obtained.

A process for the polymerization of 1,3-butadiene and for the copolymerization of 1,3-butadiene with styrene, respectively, is disclosed in DOS German Pat. No. 2,125,694, wherein a partial stream is branched off from the polymerization, and this stream is reintroduced into the reactor. Here again, a broadening of the molecular weight distribution of the polymer is achieved.

In the prior art methods described above, the processing properties of the rubber are improved by broadening the molecular weight distribution. However, all known processes have the feature in common that at least two liquid partial streams of differing viscosity must be mixed together during the course of the polymerization, entailing a considerable expenditure in energy. Moreover, in all such conventional processes, the course of the polymerization must be interfered with. Since the Li-catalyst based polymerization system reacts with extreme sensitivity to impurities, this means a difficult and often uncontrollable progression of the reaction.

Accordingly, it is an object of this invention to provide a method for producing polymers having a broad molecular weight distribution which lacks the prior art disadvantages for achieving this objective. Other objects will be apparent to those skilled in the art.

SUMMARY OF THE INVENTION

According to this invention, the molecular weight distribution of the polymer product produced in a continuous-adiabatic polymerization of 1,3-butadiene in the presence of an organolithium catalyst is increased by feeding a stream of catalyst and a stream of 1,3-butadiene and a diluent therefor into the inlet end of an elongate reaction zone at a periodically increased or reduced ratio of 1,3-butadiene to catalyst and mixing within the elongate reaction zone the thus-produced increments of polymer of differing molecular weights.

DETAILED DISCUSSION

The process of this invention is an improved process for the production of polymers having a broad molecular weight distribution by the continuous-adiabatic polymerization of 1,3-butadiene alone or in admixture with a comonomer in a diluent and in the presence of an organolithium catalyst which comprises feeding a stream of 1,3-butadiene and diluent at a constant rate to an elongate reaction zone and feeding a stream of the catalyst to the inlet zone at a rate which is periodically increased and decreased, said flow rate and rate of change of catalyst flow rate being such that segments of reaction product in the initial portion of the elongate reaction zone contain polymer having an average molecular weight which differs from the average molecular weight of the polymer in segments adjacent thereto, and said reaction zone being sufficiently elongate that said adjacent segments become remixed before the reaction product is discharged from said reaction zone.

In the process of this invention, not only is the reaction product heterogeneous in the usual sense, i.e., it contains polymers of varying average molecular weight, the average mean value for which increases from the inlet end toward the outlet end of the elongate reaction zone, it is also initially heterogeneous from segment to segment along the length of the reaction zone, i.e., the average molecular weight of the polymer in longitudinal segments of the initial portion of the reaction zone will be higher than the adjacent segment which precedes as well as follows it down the reaction zone, because of differing catalyst concentration. This latter heterogenicity is lost before the reaction product is discharged from the reaction zone by remixing in the terminal portion of the reaction zone.

Tables 1 and 2 show the effect of such periodic variation in the ratio of polymer to catalyst in the reaction zone. Under identical polymerization conditions, the Mooney value of the polymers of Examples 1–3 where the ratio is constant becomes lower but nonuniformity is substantially unaffected as the ratio of catalyst to butadiene is increased, whereas the Mooney value of the polymers of Examples 4–6, where the ratio is varied periodically, remains substantially constant and nonuniformity is higher and increases substantially as the average ratio is increased.

The analytical method which, according to the state of the art, is the most reliable for determining the molecular weight distribution of rubbers is the gel permeation chromatography (GPC). See K. H. Altgelt, J. C. Moore: "Gel Permeation Chromatography" in M. J. R. Cantow, Polymer Fractionation, Academic Press, (1967).

In this method, the nonuniformity value $U = MW/Mn - 1$ is considered the measure of the breadth of molecular weight distribution. This magnitude will be utilized hereinbelow as a value for the breadth of the molecular weight distribution.

In the aforementioned three comparative examples, the nonuniformity U of the thus-obtained polymers is practically identical at all three catalyst levels, viz., about 0.9.

According to the process of this invention, polymers can be produced having a broad molecular weight distribution adapted to a specific contemplated end use in a simple and economical manner. Moreover, such variations in mol wt distribution can be achieved without affecting Mooney viscosity values.

During the continuous-adiabatic polymerization in the flow pipe, all of the polymerization components, i.e., primarily the monomer, the diluent, the catalyst, and the cocatalyst, are mixed together in the inlet section thereof and heated to the desired initial temperature. In the subsequent polymerization section of the flow pipe, the polymerization is executed adiabatically, i.e., the temperature rises during the course of the polymerization until the final temperature has been reached.

Adiabatic polymerization means that no heat is positively introduced or removed during the polymerization. The increase in temperature occurring during an adiabatically conducted polymerization is caused by the heat of polymerization of the butadiene. The magnitude of the temperature increase depends on the specific heat of the diluent and the ratio of diluent to butadiene. Due to the practically unavoidable heat losses which occur during the process, however, most "adiabatic" polymerizations, i.e., those conducted on a commercial scale, do not proceed in a strictly adiabatic manner due to such heat losses. The same is true for the continuous-adiabatic polymerization of this invention.

As contrasted to the continuous-adiabatic polymerization of this invention, which is conducted in a flow pipe, continuous isothermal and batch-wise isothermal and adiabatic polymerizations of 1,3-butadiene are conducted in one or more series-connected polymerization reactors. Each such reactor has an agitator mechanism, by means of which the contents of the reactor are thoroughly mixed, i.e., complete intermixing is achieved. This intermixing is necessary to achieve sufficient homogeneity within the reaction and, in case of isothermal polymerizations, to permit removal of the heat of polymerization.

Since the continuous-adiabatic polymerization according to the present invention is conducted in a flow pipe and intermixing of all components occurs at the inlet section thereof and no heat is removed during the course of the polymerization, it is unnecessary to positively mix the contents of the flow pipe, i.e., employ baffle plates or stirrers, to achieve heat transfer or mixing of the reaction charge. However, in the case of very high concentrations of butadiene and polymers of very high molecular weights produced therefrom, it is advantageous to equip the flow pipe with a conventional scraping mechanism in order to avoid cakings on the pipe walls.

An important aspect of this invention is the remixing of the different units of the polymerization, i.e., the polymer-produced at the lower polymer to catalyst ratio and the product produced at the higher ratio. As stated above, because the branching and resulting Mooney value of the product is critically influenced by trace amounts of impurities, oxygen and/or water, it is important that this remixing occurs in a manner whereby such contamination is avoided. Because the reaction is conducted in an elongate reaction zone (flow pipe reactor) such remixing occurs spontaneously therein, thereby avoiding the problem of unpredictable and unscheduled changes in the properties of the polymer. Only partial mixing of the segments of the reaction product occurs due to the flow characteristics of the flow pipe. This flow pipe characteristic varies, as is known, in case of laminar as well as turbulent flow, from the ideal plug flow and thus results in only partial remixing. The extend of remixing is affected by the length of the flow pipe, viz., the amount of remixing is proportional to the length of the pipe. However, even though complete homogeniety is not achieved, sufficient mixing occurs so that the product is uniform. To ensure remixing the ratio of the length of the flow pipe to the diameter thereof should be at least 5:1, e.g., 5:1 to 200:1.

Examples of suitable organolithium catalysts are methyl-lithium, ethyllithium, n-, sec.-, tert.-butyllithium, amyllithium, phenyllithium and cyclohexyllithium. The organolithium compounds are employed in amounts averaging per cycle 0.01 – 0.1% by weight, preferably 0.02– 0.05% by weight, based on the butadiene.

The polymerization can be conducted in the presence or absence of Lewis bases. Examples of suitable Lewis bases are ethers, e.g., diethyl ether, di-n-propyl ether, diisopropyl ether, di-n-butyl ether, tetrahydrofuran, dioxane, ethylene glycol dimethyl ether, diethylene glycol dimethyl ether, diethylene glycol diethyl ether, triethylene glycol dimethyl ethers, tetraethylene glycol dimethyl ether, and tertiary amines, e.g., trimethylamine, triethylamine, N,N,N',N'-tetramethylethylenediamine, N-methylmorpholine, N-ethylmorpholine, and N-phenylmorpholine. The Lewis bases can be used in the pure form or as mixtures, in amounts of 0.01 – 10.0% by weight, preferably 0.05– 5% by weight, based on the butadiene.

The weight ratio of Lewis base to organolithium compound in the catalyst system is 0.1 : 1 to 1,000 : 1, preferably 1 : 1 to 250 : 1.

The polymerization is conducted in an inert organic diluent such as, for example, ethane, propane, iso- and n-butane, iso- and n-pentane, iso- and n-hexane, iso- and n-heptane, iso- and n-octane, cyclobutane, cyclopentane, cyclohexane, cycloheptane, cyclooctane, benzene, toluene, o-, m-, and p-xylene, or ethylbenzene, preferably in iso- and n-butane, iso- and n-pentane, iso- and n-hexane, iso- and n-heptane. One such diluent or a mixture thereof can be employed.

Two temperature values are characteristic for the polymerization of 1,3-butadiene under adiabatic conditions, viz., the temperature at which the polymerization is initiated is 30°–110° C, and the temperature at which the polymerization is terminated is 155°–250° C.

In Li-catalyst based polymerizations, the molecular weight and/or the Mooney value (which is the standard value customary in the rubber technology for the molecular weight) are directly affected by catalyst concentration, since each catalyst molecule triggers the growth of only one polymer chain.

In the continuous-adiabatic polymerization of 1,3-butadiene, since the rate of catalyst feed into the inlet section of the flow pipe is periodically increased and lowered, zones of a higher and lower catalyst concentration, respectively, are produced in the inlet section. As a result, zones with lower and zones with higher average molecular weight are produced at the beginning of the polymerization in the flow pipe.

Figure 3:
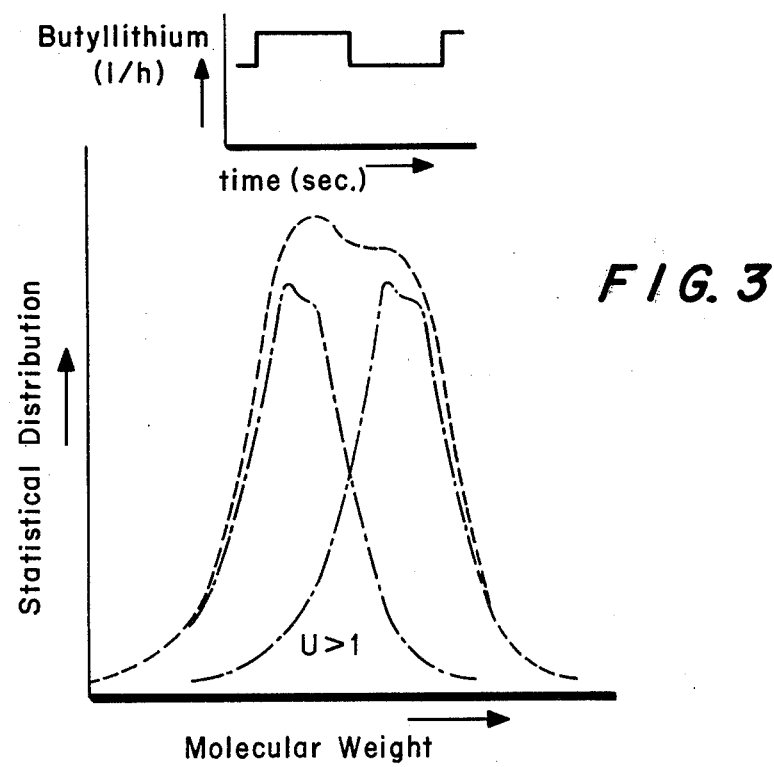

The time between each periodical increase (or decrease) in catalyst quantity is referred to herein as the cycle time. The time of each cycle which is optimum to achieve the desired increase in U value is determined in part by the relationship of the cross-sectional area of the flow pipe to the flow rate of the reaction mixture flowing therethrough. If the cycle time is too short or flow too low, the difference in ratio of 1,3-butadiene to catalyst from one increment of reaction mixture to another in the flow pipe will lessen due to more rapid mixture thereof in the flow pipe. If the cycle time is too long or flow rate too high, remixing of the polymers in the flow pipe will not occur. To ensure heterogenicity in the initial portion of the flow pipe, and remixing of the polymers in the terminal portion thereof, a flow rate of at least $1.10^{-3}$ liters/second/cm$^2$, preferably $1.10^{-3}$ to $5.10^{-2}$ l./sec./cm$^2$, of flow pipe cross-sectional is employed, with a cycle time of at least 1 sec., preferably 3 to 30 sec., and not more than 25%, preferably 1 to 20% of the resident time of the reaction mixture in the flow pipe. Due to the partial remixing occurring in the flow pipe, an intermixing of the product zones occurs during the course of the polymerization along the length thereof. When adapting the cycle time to this remixing process, the mixing step is terminated at the end of the polymerization, so that uniform polymers having a broadened molecular weight distribution result. This effect upon molecular weight distribution is schematically illustrated in FIG. 3.

Figure 2:
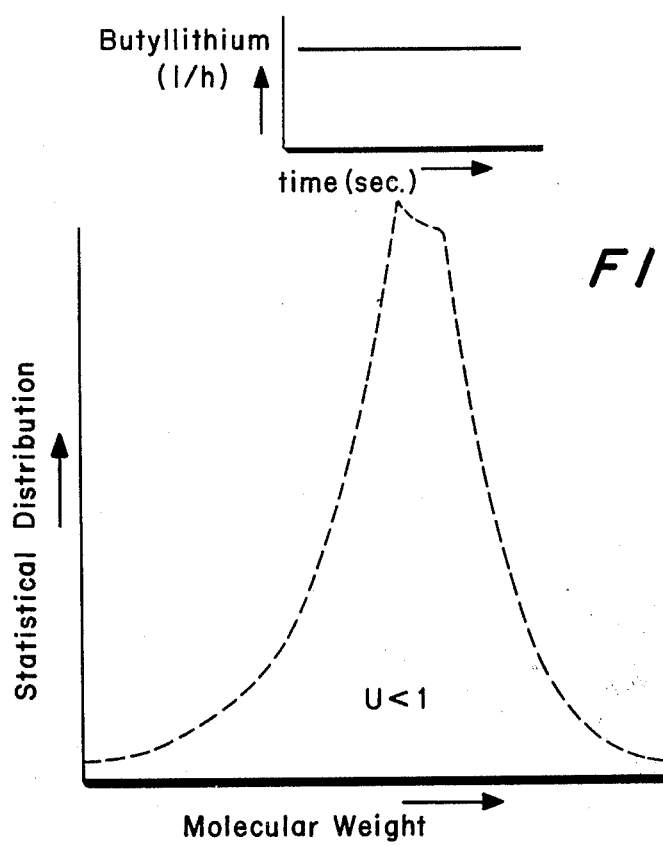

As shown in FIG. 2, when the ratio of 1,3-butadiene to catalyst is constant, the proportion (statistical distribution) of polymers of various molecular weights in the product when plotted against their molecular weight defines a steep curve whereas the polymers of the products of the process of this invention define a broader curve, showing lower proportion of polymers with a molecular weight substantially higher and substantially lower than the mean average molecular weight of the total polymer product. In other words, the total polymer product of the process of this invention has a higher molecular weight distribution (U).

The increase in the molecular weight distribution (U) is shown in Table 2, with reference to Examples 4–6. With a periodic increase and/or reduction in the catalyst feed polymers are obtained having greater nonuniformities U than the polymers of Examples 1–3 in which the catalyst feed rate is uniform. Thus, as compared to the polymers of Comparative Examples 1–3, a substantial broadening of the molecular weight distribution is achieved.

Because the increase in the molecular weight distribution of the product is achieved by varying the ratio of 1,3-butadiene to catalyst, it will be apparent that equivalents of periodically reducing (or increasing) the flow rate of the catalyst stream are:

a. continuously varying the flow rate, i.e., constantly varying the catalyst flow rate from a predetermined minimum to a predetermined maximum;

b. maintaining the flow rate of the polymer constant and varying the flow rate of the 1,3-butadiene, which is possible in a continuous adiabatic polymerization only if the volume of diluent in the catalyst stream is relatively high and the volume of diluent in the 1,3-butadiene stream is relatively low, so that the flow rate of total diluent through the reactor is substantially constant; and c. employing a mixture of 1,3-butadiene and another monomer, e.g., styrene.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES 1–3 (COMPARATIVE EXAMPLES)

Employing the flow pipe reactor 10 shown schematically in FIG. 1, a stream of liquid consisting of 78 parts by weight of hexane and 22 parts by weight of 1,3-butadiene is pumped by pump 12 at 400 liters/hour continuously through an insulated iron pipe 14 having a diameter of 70 mm. and a length of 12,000 mm., the inlet portion of which consists of a mixing section 16 of a diameter of 5 mm. and a length of 500 mm., and the outlet portion of which is provided with a pressure-maintaining device 18. The liquid stream is heated to 70° C before entering the mixing section. Based on the butadiene, 0.05% by weight of ethylene glycol dimethyl ether and n-butyllithium is uniformly introduced at a constant rate by conventional metering device 20 into the mixing section 16 in amounts as set forth in Table 1 (percent by weight, based on the butadiene). The diluent, the butadiene, and the Lewis base must be completely dry and free of oxygen. Because polymerization begins after the mixing section, the temperature in the flow pipe rises constantly up to a final value of 166° C. The pressure in the pipe is 10 bars. The polymer solution discharged downstream of the pressure-maintaining device 18 is stabilized by the addition of 0.5% by weight, based on the butadiene, of di-tert.-butyl-p-cresol and, after cooling in heat exchanger 19, is worked up in a work-up zone 30 by separating the hexane with steam. The properties of the polymer after drying are shown in Table 1.

TABLE 1

| | Uniform Catalyst Feed | | |
| --- | --- | --- | --- |
| Example | n-Butyllithium(wt%) Based on Butadienes | ML-4 100° C. | Nonuniformity U |
| 1 | 0.0405 | 65 | 0.91 |
| 2 | 0.0470 | 44 | 0.88 |
| 3 | 0.0565 | 26 | 0.92 |

EXAMPLES 4–6

The procedure of Examples 1–3 is followed, except the n-butyllithium is added to the mixing section at a fluxuating rate with a cycle time of 6 seconds, in amounts (weight percent, based on the butadiene) varying from the high and low values set forth in Table 2 employing a conventional metering device 20.

TABLE 2

| | Periodic (6 Sec.) Catalyst Feed | | | | |
|---|---|---|---|---|---|
| | Butyllithium (Wt.%) Based on Butadiene | | | | |
| | Maximum Amount | Minimum Amount | Average Amount | ML-4 | Nonuniformity |
| Example | Per Cycle | Per Cycle | Per cycle | 100° C. | U |
| 4 | 0.0510 | 0.0432 | 0.0471 | 43 | 1.55 |
| 5 | 0.0538 | 0.0418 | 0.0478 | 41 | 1.95 |
| 6 | 0.0565 | 0.0405 | 0.0480 | 40 | 2.16 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of polymers having a broad molecular weight distribution by the continuous-adiabatic polymerization of 1,3-butadiene alone or in admixture with a comonomer in a diluent and in the presence of an organolithium catalyst which comprises feeding a stream of 1,3-butadiene and diluent at a constant flow rate of at least $1.10^{-3}$ liters/sec./cm$^2$ to an elongate reaction zone and feeding a stream of the catalyst to the inlet zone at a rate which is periodically increased and decreased with a cycle time of at least 1 sec., said flow rate and rate of change of catalyst flow rate being such that segments of reaction product along the length of the initial portion of the elongate reaction zone contain polymer having an average molecular weight which differs from the average molecular weight of the polymer in preceding and following like segments of reaction product adjacent thereto, and said reaction zone has a length to diameter ratio from about 5:1 to about 200:1 and is sufficiently elongate that said adjacent segments become remixed before the reaction product is discharged from said reaction zone.

2. A process according to claim 1 wherein the elongate reaction zone is tubular with a ratio of length to diameter of from about 5:1 to about 200:1.

3. A process according to claim 1 wherein 1,3-butadiene only is homopolymerized.

4. A process according to claim 1 wherein the cycle time is about 1 to 30 seconds.

* * * * *